US008000090B2

(12) United States Patent
Moscovitch

(10) Patent No.: US 8,000,090 B2
(45) Date of Patent: Aug. 16, 2011

(54) MULTI-MONITOR SUPPORT STRUCTURE

(76) Inventor: Jerry Moscovitch, Toronto (CA)

(*) Notice: Subject to any disclaimer, the term of this patent is extended or adjusted under 35 U.S.C. 154(b) by 0 days.

(21) Appl. No.: 11/941,646

(22) Filed: Nov. 16, 2007

(65) Prior Publication Data

US 2008/0117578 A1    May 22, 2008

Related U.S. Application Data

(60) Provisional application No. 60/866,163, filed on Nov. 16, 2006.

(51) Int. Cl.
*H05K 5/00* (2006.01)
*H05K 7/00* (2006.01)

(52) U.S. Cl. .......... 361/679.04; 361/679.21; 361/679.22

(58) Field of Classification Search ............ 361/681, 361/679.04, 679.21, 679.22; 248/917, 924
See application file for complete search history.

(56) References Cited

U.S. PATENT DOCUMENTS

| | | | | |
|---|---|---|---|---|
| 3,262,517 A * | 7/1966 | Malec Jerry P | ............... | 182/2.6 |
| 4,646,875 A * | 3/1987 | Sholl | ............... | 182/2.6 |
| 4,646,876 A | 3/1987 | Sholl | | |
| 4,814,759 A | 3/1989 | Gombrich | | |
| 5,076,524 A * | 12/1991 | Reh et al. | ............. | 248/296.1 |
| 5,177,616 A * | 1/1993 | Riday | ............. | 348/837 |
| 5,316,369 A * | 5/1994 | Kanda | ............. | 297/188.15 |
| 5,375,641 A * | 12/1994 | Schlueter | ............. | 160/135 |
| 5,494,447 A * | 2/1996 | Zaidan | ............. | 439/31 |
| 5,505,424 A * | 4/1996 | Niemann | ............. | 248/585 |
| 5,537,290 A * | 7/1996 | Brown et al. | ............. | 361/679.06 |
| 5,590,021 A * | 12/1996 | Register | ............. | 361/679.21 |
| 5,687,939 A * | 11/1997 | Moscovitch | ............. | 248/122.1 |
| 5,900,848 A * | 5/1999 | Haneda et al. | ............. | 345/1.1 |
| D425,036 S * | 5/2000 | Copus et al. | ............. | D14/375 |
| 6,094,341 A * | 7/2000 | Lin | ............. | 361/679.04 |
| 6,134,103 A * | 10/2000 | Ghanma | ............. | 361/679.05 |
| 6,151,401 A * | 11/2000 | Annaratone | ............. | 381/388 |
| 6,222,507 B1 * | 4/2001 | Gouko | ............. | 345/1.1 |
| 6,343,006 B1 * | 1/2002 | Moscovitch et al. | ..... | 361/679.04 |
| 6,449,143 B2 * | 9/2002 | Rooyakkers et al. | ......... | 361/681 |
| 6,532,146 B1 * | 3/2003 | Duquette | ............. | 361/679.04 |
| 6,554,238 B1 | 4/2003 | Hibberd | | |
| 6,667,877 B2 | 12/2003 | Duquette | | |
| 6,667,878 B2 * | 12/2003 | Ponx | ............. | 361/679.04 |
| 6,758,454 B2 | 7/2004 | Smed | | |

(Continued)

FOREIGN PATENT DOCUMENTS

JP             62197815            9/1987

(Continued)

OTHER PUBLICATIONS

Cover Letter from Matthew J.S. Graham, Attorney for Ergotron, Inc.; dated Aug. 14, 2009.

(Continued)

*Primary Examiner* — Jayprakash N Gandhi
*Assistant Examiner* — Anthony M Haughton

(57) ABSTRACT

Described herein is a multi-monitor support structure having a first monitor, a second monitor, a column, an arm coupled to the column for supporting the first monitor and the second monitor, a first coupling unit for coupling the first monitor to the arm, and a second coupling unit for coupling the second monitor to the arm. The first monitor and the second monitor can be separated to create a gap therebetween for accommodating a third monitor, such as from a notebook computer, which is supported by the arm.

12 Claims, 12 Drawing Sheets

U.S. PATENT DOCUMENTS

| | | | |
|---|---|---|---|
| 6,844,865 B2* | 1/2005 | Stasko | 345/1.3 |
| 7,331,551 B2* | 2/2008 | Oddsen, Jr. | 248/279.1 |
| 2002/0011544 A1 | 1/2002 | Bosson | |
| 2006/0238967 A1* | 10/2006 | Carson et al. | 361/681 |

FOREIGN PATENT DOCUMENTS

| | | |
|---|---|---|
| JP | 63233417 | 9/1988 |
| WO | 98/45772 | 10/1998 |
| WO | 00/39493 | 7/2000 |
| WO | 01/35196 | 5/2001 |
| WO | 01/35197 | 5/2001 |

OTHER PUBLICATIONS

DS100 Flyer dated Jul. 23, 2002.
DS100 Install Manual dated Mar. 2003.
FP Order Guide dated Dec. 12, 2002.
FPM Arm Catalog dated Aug. 2002.
XBar Extens Install Manual dated Mar. 2003.
Invoice No. 196156 to Bloomberg.
Invoice No. 158382 to Trikinetic Technologies.
Invoice No. 158045 to Baymont Inn.
Package from Damon A. Neagle of Design IP (representing Innovative Office Products, Inc.) dated Jan. 8, 2010; package includes cover letter, and six appended documents (Tabs 1-6).
Complaint filed Nov. 12, 2009 in the U.S. District Court for the Eastern District of Texas; Cause No. 2:09-cv-358; Mass Engineered Design Inc. and Jerry Moscovitch, defendants.
U.S. Appl. No. 09/869,259; (originally filed inventors: Jerry Moscovitch and Mark Elchuk); filing date Nov. 28, 2001.
U.S. Appl. No. 12/696,929; inventor: Jerry Moscovitch; filing date Jan. 29, 2010.
Ergotron Ergonomic Computer Workstations Component Product Catalog (labeled DEL 004607-DEL 004648; Jul. 1, 1992).
PC Workstation Pubications (labeled DEL 004692 and also E-031429); Modern Office Technology; Nov. 1988.
National TeleVAR Publication (labeled DEL 004693); TypeWorld; First Aug. 1990; Issue 11.
Raster Devices 2 Direct Inc. (labeled DEL 004690); Mar. 1990.
Ergotron Postcard Publication (labeled DEL 004691); 1992.
Raster Devices 2 Direct Inc. (labeled DEL 004689); Apr. 1990.
Ergotron Postcard Publication (labeled DEL 004670); 1992.
Mac II Workstation publication (labeled DEL 004571-DEL 004572); MacWEEK; Oct. 11, 1998.
Mac II Workstation publication (labeled DEL 004573); MacWEEK; Oct. 11, 1998.
Ergotron Design Station Publication (labeled DEL 004574).
Raster Devices 2 Direct Inc. (labeled DEL 004575); Apr. 1990.
Raster Devices 2 Direct Inc. (labeled DEL 004576); Mar. 1990.
Graphics and Design Publication (labeled DEL 004579; "early 90's".
Ergotron LAN Racking and Cable Management Systems Product Catalog (labeled DEL 004580); Mar. 1, 1995.
Computer Packing System Publication (labeled E-031476); Managing Office Technology; Aug. 1993.
Response to Office Action; dated Jul. 21, 2006; U.S. Appl. No. 09/869,259.

* cited by examiner

MULTI-MONITOR SUPPORT STRUCTURE

CROSS-REFERENCE TO RELATED APPLICATION

This application claims priority from U.S. Provisional Application No. 60/866,163, filed on Nov. 16, 2007.

BACKGROUND OF THE INVENTION

The number of computer systems incorporating multi-monitor display systems has increased in recent years as computer users in various industries adapt their use to new environments. For example, a multi-monitor display system can be used to create the illusion of a larger screen, thereby allowing a securities trader to view a large single spreadsheet over several displays. Alternately, the trader may view individual applications on individual screens (for example, one screen may display a Web Browser, a second a new service and a third a spreadsheet of financial data).

Individuals working with still or moving images, such as graphics artists, video or film editors or medical diagnosticians may also use multi-monitor display systems. A given image may be viewed across several screens or two images may be viewed side-by-side (such as two x-ray images used to assess the extent to which a broken bone has healed).

A person wishing to acquire a multi-monitor display system may already have a single-monitor computer, such as a notebook computer. Even if that person acquires a multi-monitor display system, the person might still want to continue to own a notebook computer because it is easier to transport than a computer system incorporating a multi-monitor display system. Thus, it would be desirable to amalgamate parts of both systems to augment the display area.

SUMMARY OF THE INVENTION

In accordance with this goal, described herein is a multi-monitor support structure having a first monitor, a second monitor, a column, an arm coupled to the column for supporting the first monitor and the second monitor, a first coupling unit for coupling the first monitor to the arm, and a second coupling unit for coupling the second monitor to the arm. The first monitor and the second monitor can be separated to create a gap therebetween for accommodating a third monitor, such as from a notebook computer, which is supported by the arm.

DESCRIPTION OF THE INVENTION

Figure 1A:
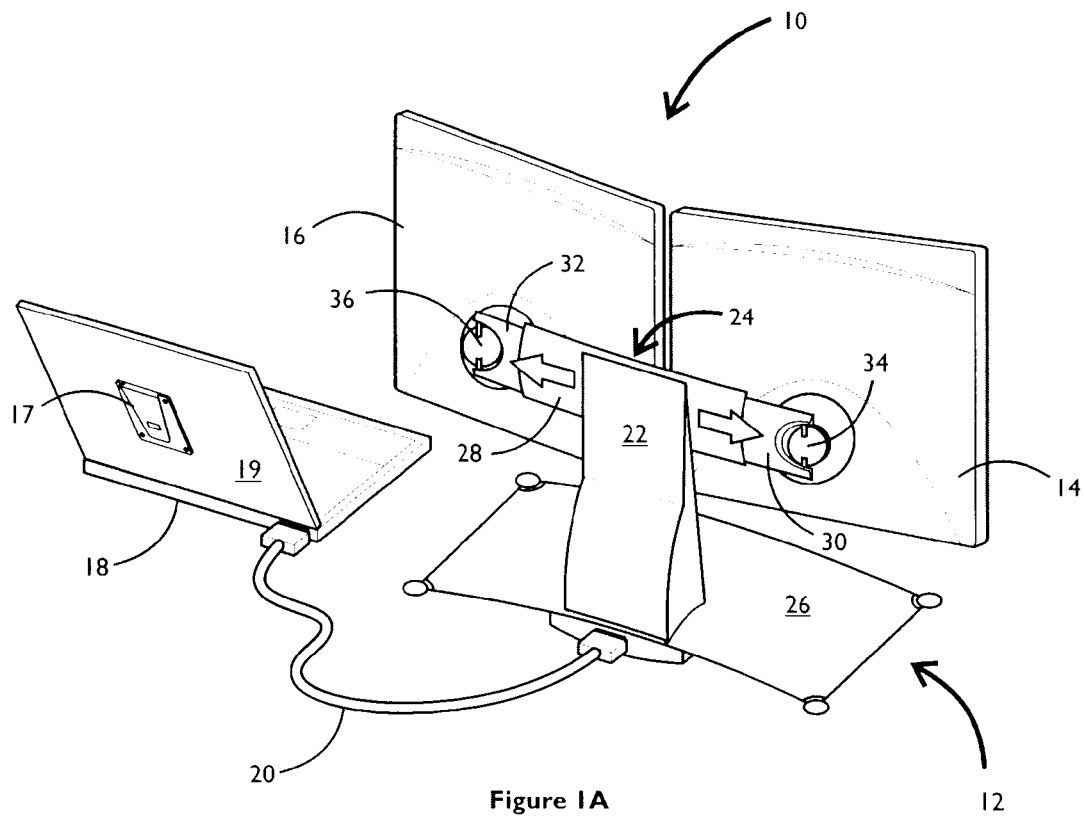
FIG. 1A shows a multi-monitor display system with an arm in the retracted position, according to the principles of the present invention.

FIG. 1A shows a multi-monitor display system 10, which includes a multi-monitor support structure 12, a first monitor 14 and a second monitor 16. The two monitors 14 and 16 are in electronic communication with a CPU (not shown) in a notebook computer 18 via a cable 20. The notebook computer 18 includes a third monitor 19. Instead of a notebook computer 18, the CPU can reside in a desktop computer, for example.

The multi-monitor support structure 12 includes a column 22, an arm 24 and a base 26, both of which are coupled to the column 22. The arm 24 has a central portion 28. A first end portion 30 and a second end portion 32 are connected to the central portion 28 at opposite ends thereof. The support structure 12 also includes a first coupling unit 34 and a second coupling unit 36.

The arm 24, more specifically the first and second end portions 30 and 32, supports monitors 14 and 16. The coupling units 34 and 36 couple the monitors 14 and 16 to the arm 24.

Figure 1B:
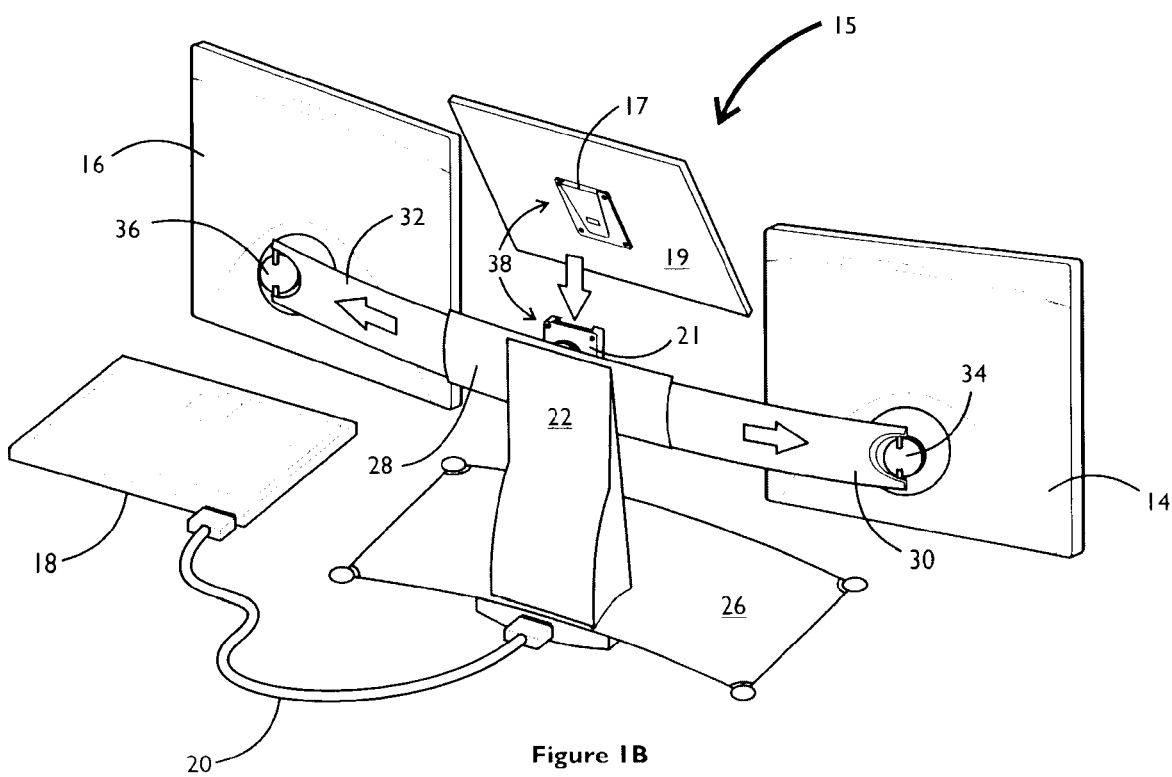
FIG. 1B shows the multi-monitor display system of FIG. 1A with the arm in the extended position.

The arm 24 is capable of being lengthened from a first length shown in FIG. 1A to a second length shown in FIG. 1B. In general, an arm can be lengthened in a number of ways. In the method of lengthening shown in FIGS. 1A and 1B, the first end portion 30 is capable of extending from a retracted position, shown in FIG. 1A, to an extended position, shown in FIG. 1B. Likewise, the second end portion 32 is capable of extending from a retracted position, shown in FIG. 1A, to an extended position, shown in FIG. 1B. In this manner, the length of the arm 24 increases from the first length of FIG. 1A, to the second length of FIG. 1B. The first and second end portions 30 and 32 can telescope within the central portion 28, for example.

As shown in FIG. 1A, with the first and second end portions 30 and 32 in the retracted positions, the first monitor 14 and the second monitor 16 are adjacent when supported therefrom. As shown in FIG. 1B, with the first and second end portions 30 and 32 in the extended positions, a gap 15 appears between the first monitor 14 and the second monitor 16 when supported by the first and second end portions 30 and 32. The gap is wide enough to accommodate the third monitor 19, which has been taken from the notebook computer 18. Instead of the notebook monitor 19, a different monitor can be supported in the gap 15.

The third monitor 19 is supported by the central portion 28 with a third coupling unit 38. In the example shown in FIG. 1B, the third coupling unit 38 includes a first component 17, disposed on the back of the third monitor 19, and a complimentary shaped second component 21, disposed on the central portion 28. The first component 17 mates with the second component 21 to support the monitor 19. The first component 17 can be affixed to the monitor 19 and the second component 21 can be affixed to the central portion 28 by any appropriate means, such as screws, clamps, pins and sockets, clips, and adhesive. Examples of first and second components of the third coupling unit are described below with reference to a connector apparatus for displays. A joint assembly can also be added to the third coupling unit to permit the central display to rotate about various axes, if desired.

In a different embodiment, where perhaps the monitor 19 is not easily removable from the rest of the notebook computer, the whole notebook computer, including the keyboard, can be supported by the central portion with an appropriate coupling unit.

In the embodiment shown, the second component 21 of the third coupling unit 38 is not on the central portion 28 when the multi-monitor support structure 12 is in the retracted position of FIG. 1A, where the monitors are supported by the end portions 30 and 32 in the retracted positions. Thus, with appropriate fasteners, the second component 21 of the third coupling unit 38 is removably added to the central portion 28 when the end portions 30 and 32 are in the extended positions, for example, but before the third monitor 19 is added. In an alternate embodiment, the second component of the third coupling unit can remain affixed to the central portion, even when the first and second monitors are supported by the end portions in the retracted positions. In this embodiment, the second component of the third coupling unit does not support a monitor when the first and second monitors are supported by the end portions in the retracted positions.

Figure 1C:
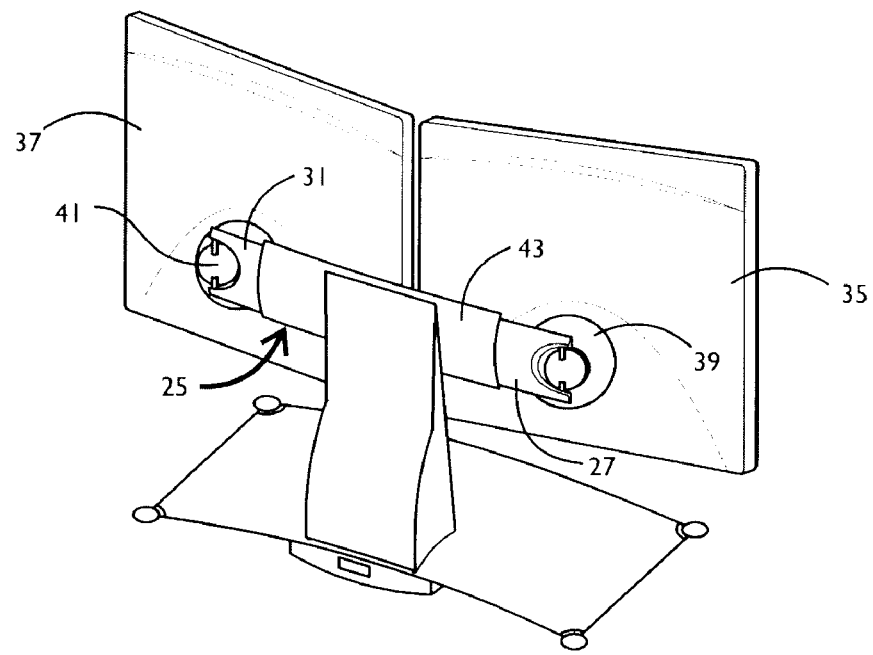
FIG. 1C shows a multi-monitor display system with a short arm configuration, according to the principles of the present invention.
Figure 1D:
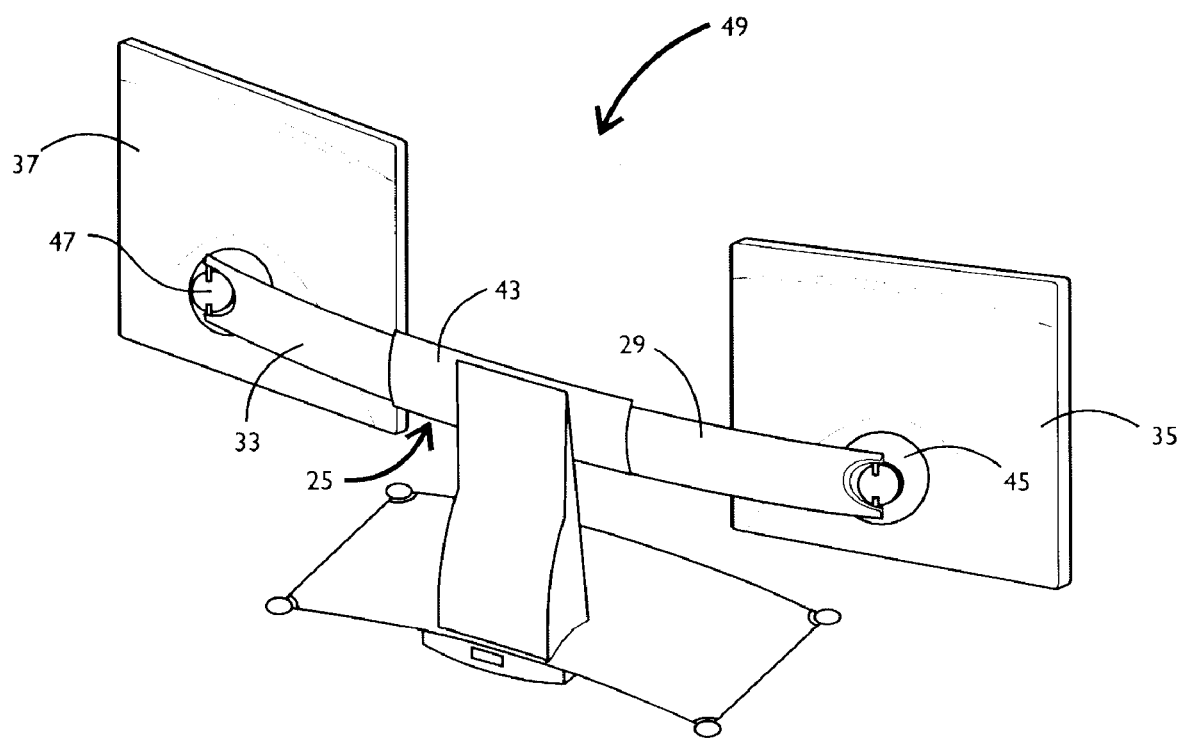
FIG. 1D shows the multi-monitor display system of FIG. 1C with a long arm configuration, according to the principles of the present invention.

Instead of increasing the length of an arm by extending its first and second end portions, in another embodiment shown in FIGS. 1C and 1D, the length of an arm 25 can be increased by replacing a first end portion 27 by a longer third end portion 29, and replacing a second end portion 31 by a longer fourth end portion 33. In this embodiment, first and second monitors 35, 37 can be uncoupled from first and second coupling units 39, 41 on the first and second end portions 27, 31 (see below for a description of how monitors can be removed). Next, the first and second end portions 27, 31 can be removed from a central portion 43, and replaced by the third and fourth end portions 29, 33 having third and fourth coupling units 45, 47, respectively. The first and second monitors 35, 37 (or any other pair of monitors) can then be put back on the arm 25 by coupling them to the third and fourth coupling units 45, 47 on the third and fourth end portions 29, 33. Where appropriate, the third and fourth coupling units can coincide with the first and second coupling units 39 and 41; in this case, the first and second coupling units 39, 41, or portions thereof, can be removed from the first and second end portions 27 and 31 and attached to the third and fourth end portions 29, 33 to be reused in the longer arm arrangement shown in FIG. 1D. In any case, the resultant increased length of the arm is large enough to leave a gap 49 between the two monitors 35, 37 that is wide enough to accommodate a third monitor (not shown) therebetween, as illustrated in FIG. 1D.

Figure 2A:
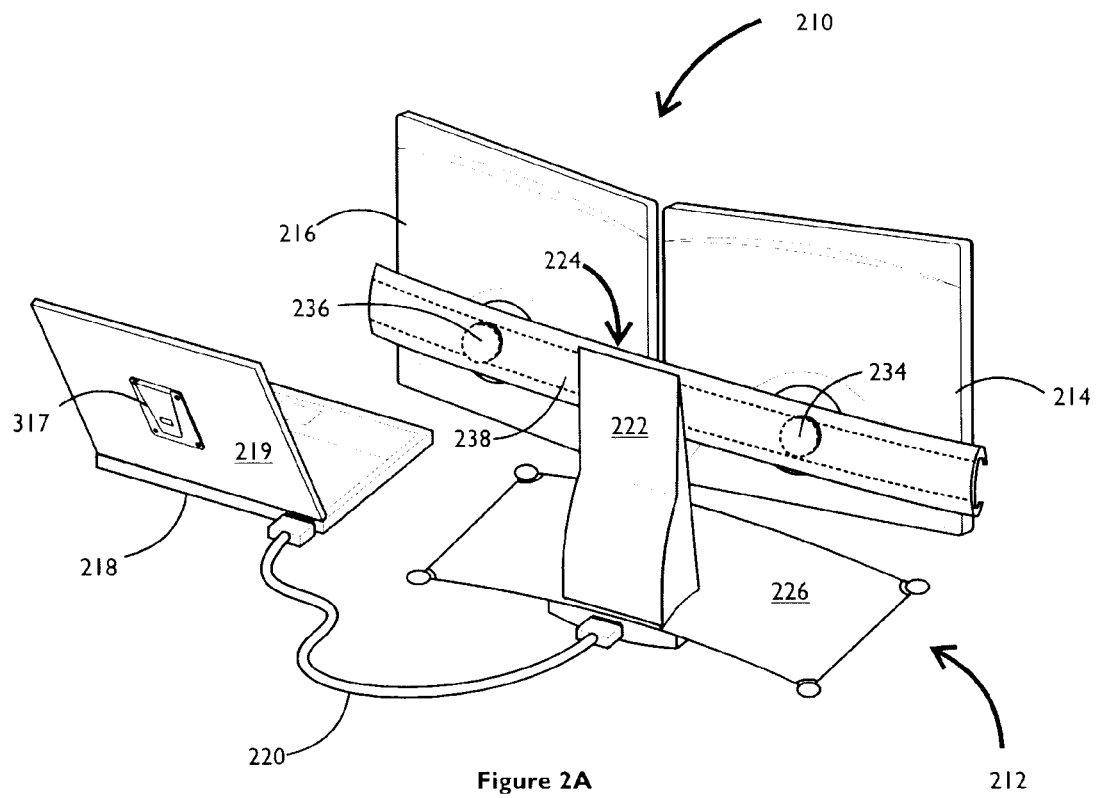
FIG. 2A shows a multi-monitor display system with two adjacent displays, the system having a track on an arm that supports the displays, according to the principles of the present invention.
Figure 2B:
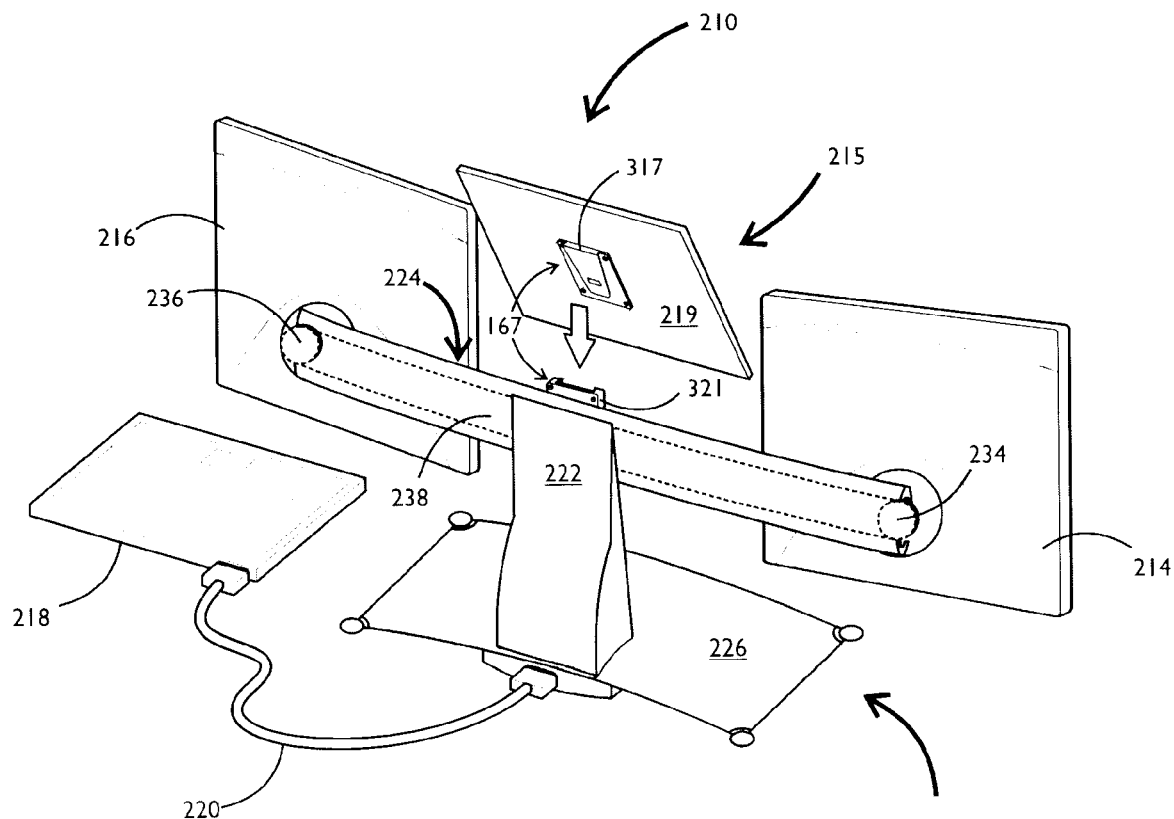
FIG. 2B shows the multi-monitor display system of FIG. 2A with the two displays separated.

In another embodiment shown in FIGS. 2A and 2B, a multi-monitor display system 210 includes a multi-monitor support structure 212, a first monitor 214 and a second monitor 216. The two monitors 214 and 216 are in electronic communication with a CPU (not shown) in a notebook computer 218 via a cable 220. The notebook computer 218 includes a third monitor 219. Instead of a notebook computer 218, the CPU can reside in a desktop computer, for example.

The multi-monitor support structure 212 includes a column 222, an arm 224 and a base 226, both of which are coupled to the column 222. The support structure 212 also includes a first coupling unit 234 and a second coupling unit 236 for coupling the monitors 214, 216 to the arm 224. The coupling units 234 and 236 can each move along a track 238 on the arm 224, which allows a gap 215 to be created between the monitors 214 and 216 wide enough to accommodate the third monitor 219. In this embodiment, the length of the arm 224 remains fixed, and it is the movement of the coupling units 234, 236 on the arm 224 that creates a gap 215 to allow a third monitor to be supported therein.

The third monitor 219 can be supported from the arm 224 with a third coupling unit 167. In the example shown in FIG. 1B, the third coupling unit 167 includes a first component 317, disposed on the back of the third monitor 219, and a complimentary shaped second component 321, disposed on the arm 224. The first component 317 mates with the second component 321 to support the monitor 219. The first component 317 can be affixed to the monitor 219 and the second component 321 can be affixed to the arm 224 by any appropriate means, such as screws, clamps, pins and sockets, clips, and adhesive. Examples of first and second components of the third coupling unit are described below with reference to a connector apparatus for displays. A joint assembly can also be added to the third coupling unit to permit the central display to rotate about various axes, if desired.

In a different embodiment, where perhaps the monitor 219 is not easily removable from the rest of the notebook computer, the whole notebook computer, including the keyboard, can be supported by the central portion with an appropriate coupling unit.

In the embodiment shown, the second component 321 of the third coupling unit 167 is not on the arm 224 when the multi-monitor support structure 212 is in the closed position of FIG. 2A, where the monitors are adjacent to each other. Thus, with appropriate fasteners, the second component 321 of the third coupling unit 167 is removably added to the arm 224 before the third monitor 219 is added. In an alternate embodiment, the second component of the third coupling unit can remain affixed to the central portion, even when the first and second monitors are adjacent to each other.

Figure 2C:
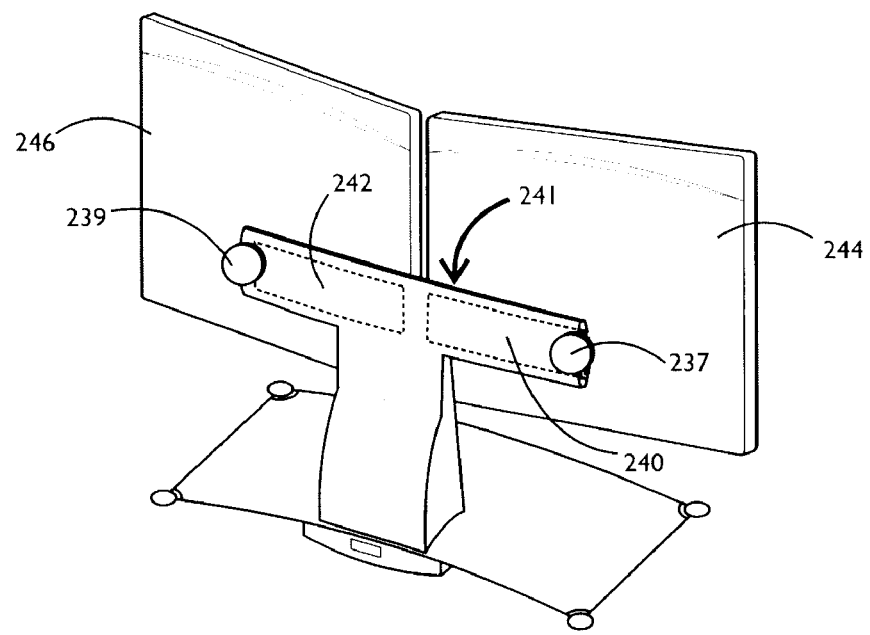
FIG. 2C shows a multi-monitor display system with two adjacent displays having tracks thereon, according to the principles of the present invention.
Figure 2D:
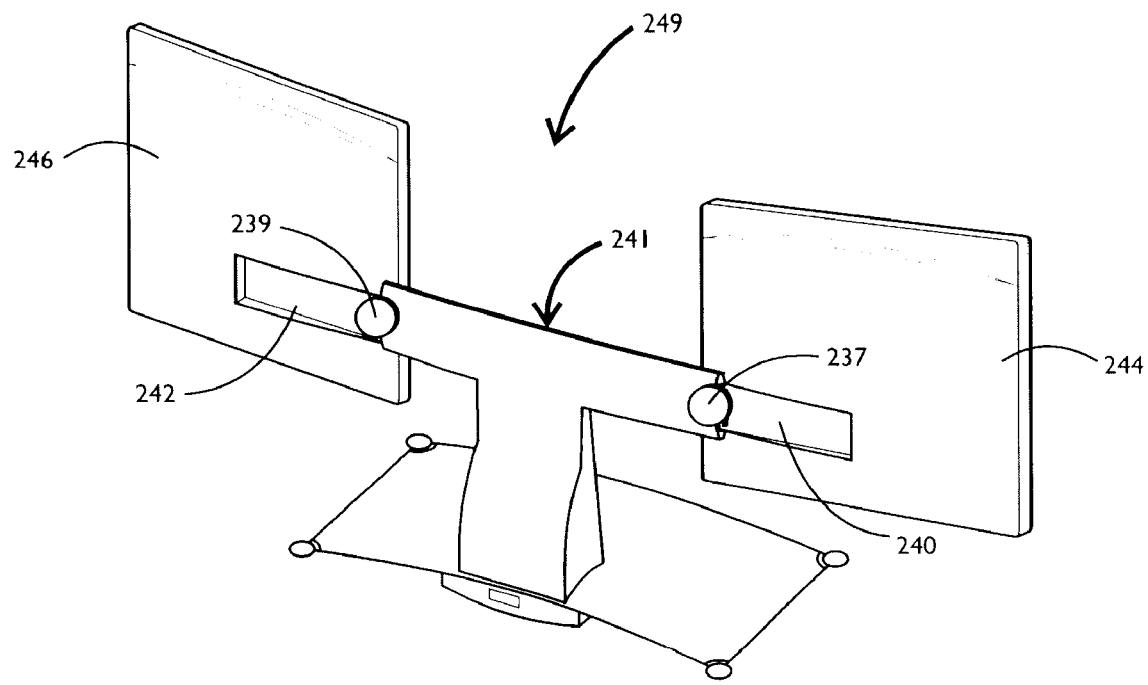
FIG. 2D shows the multi-monitor display system of FIG. 2C with the two displays separated.

In a different embodiment shown in FIGS. 2C and 2D, coupling units 237 and 239 remain stationary with respect to an arm 241 of fixed length, while tracks 240 and 242 on the monitors 244 and 246 allow the monitors to move with respect to the arm 241, and in particular to separate to thereby create a gap 249 wide enough to accommodate a third monitor (not shown), as illustrated in FIG. 2D.

FIGS. 3A-D show another embodiment of a multi-monitor display system 50, which includes a multi-monitor support structure 52, a first monitor 54 and a second monitor 56. The two monitors 54 and 56 are in electronic communication with a CPU (not shown) in a notebook computer 58 via a cable 60. The notebook computer 58 includes a third monitor 59. Instead of a notebook computer 58, the CPU can reside in a desktop computer, for example.

The multi-monitor support structure 52 includes a column 62, an arm 64 and a base 66, both of which are coupled to the column 62. The arm 64 has a central portion 68, and a first end portion 70 and a second end portion 72 connected to the central portion 68 at opposite ends thereof. The support structure 52 also includes a first coupling unit 74 and a second coupling unit 76. A third coupling unit, which includes a first component 53 and a second component (not shown), allows the third monitor 59 to be supported from the central portion 68, in a similar manner to that shown in FIGS. 1A and 1B.

The arm 64, and more specifically the first and second end portions 70 and 72, supports monitors 54 and 56. The coupling units 74 and 76 couple the backs of the monitors 54 and 56 to the arm 64. Instead, the coupling units can couple to the bottom, side or top of the respective monitors.

In a manner similar to the arm 24 described above, the arm 64 may be lengthened and shortened, by extending and retracting, to support a third monitor, such as the monitor 59.

Figure 3A:
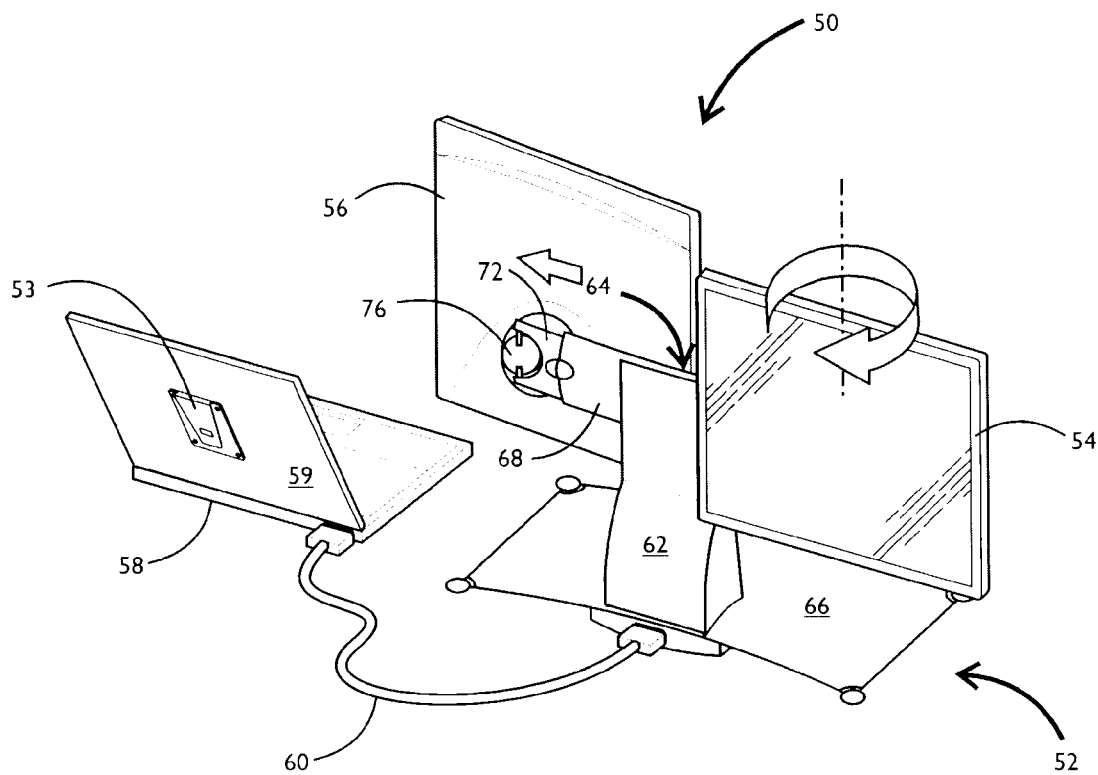
FIGS. 3A-D show a multi-monitor display system having displays that can be separated to accommodate a third monitor, rotated about a vertical axis, changed from landscape to portrait orientations, and arranged one on top of the other, according to the principles of the present invention.

In addition, the first coupling unit 74 and the second coupling unit 76 allow the respective monitors 54 and 56 coupled therewith to the arm to rotate 180° about a vertical axis. FIG. 3A, for example, shows monitor 54 rotated by 180°. It should be understood that the coupling unit also allows rotation through an angle in the range of zero to 180 degrees. Indeed, if there is sufficient clearance to prevent the display 54 from contacting the arm 64, the display can be rotated even a bit more than 180 degrees. Thus, this embodiment provides a booking multi-screen system that, by rotating the screens, can serve two persons facing each other.

Figure 3B:
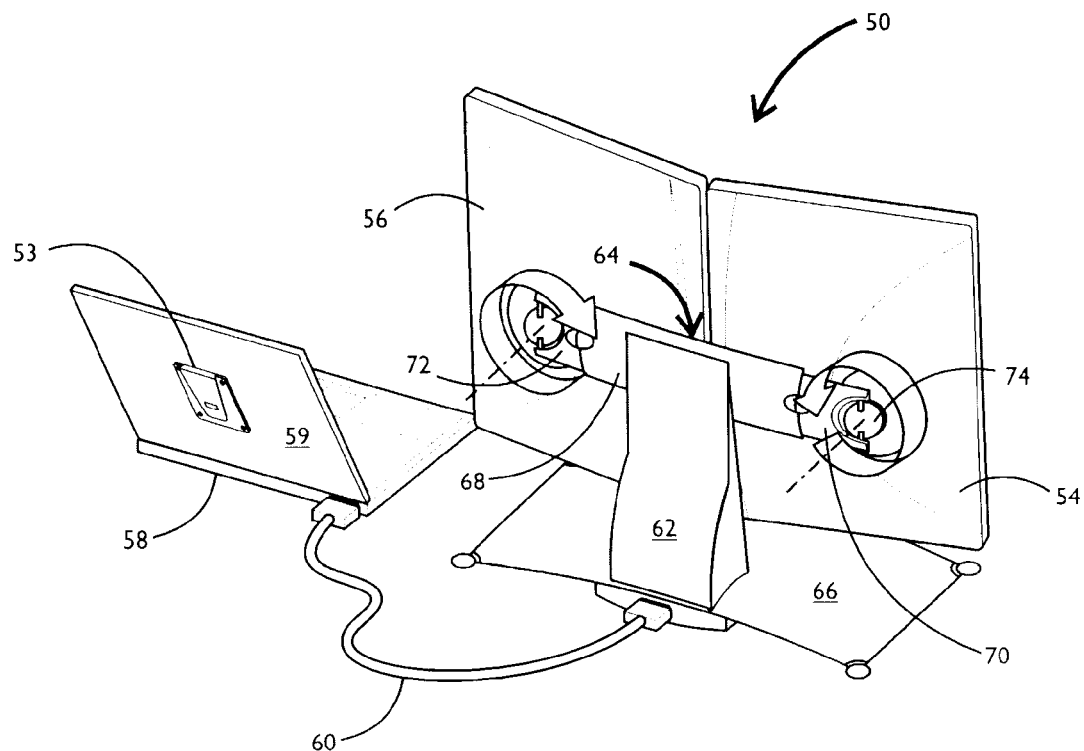

Moreover, the first coupling unit 74 and the second coupling unit 76 allow the respective monitors 54 and 56 coupled therewith to the arm to rotate from a landscape position to a portrait position. In FIG. 3B, both monitors 54 and 56 have been rotated from landscape into portrait positions. Thus, three monitors can be supported with all the permutations of landscape and portrait positions (e.g., two landscape, one portrait; three portrait; etc.). In other embodiments, an arm can be lengthened to leave a gap to accommodate a third monitor in a portrait or landscape orientation, either by extending, as in FIG. 1B, or by replacing the end portions with longer ones, as in FIG. 1D. Alternatively, tracks can be employed to create the gap, as in FIG. 2B or 2D.

Figure 3C:
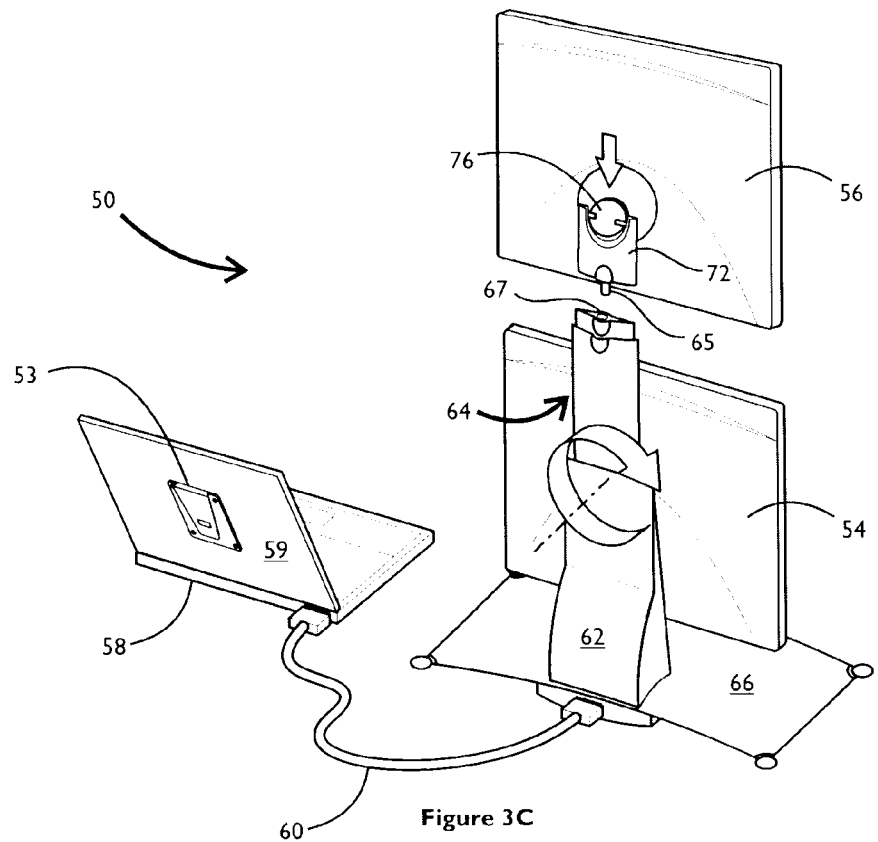
Figure 3D:
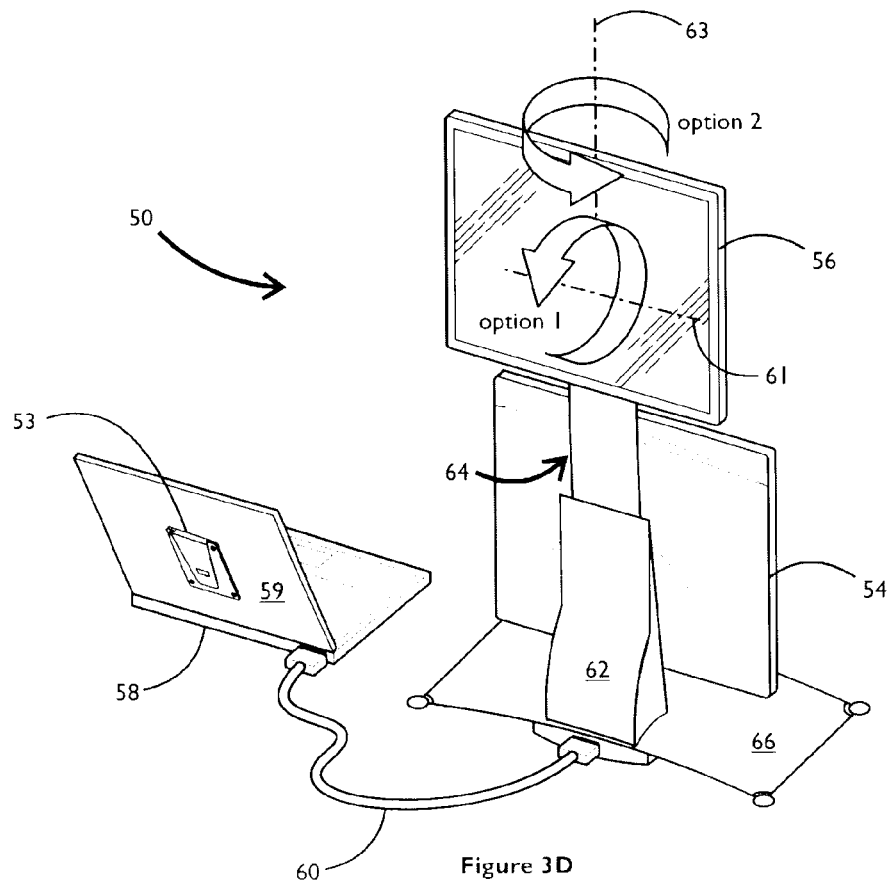

Referring to FIG. 3C, the arm 64 is also capable of rotating 90° about a horizontal axis, resulting in the monitors 54 and 56 being stacked one on top of the other. FIG. 3D shows an arrangement in which the arm 64 is vertical and the monitor 56 is rotated by 180° to face in an opposite direction than that of monitor 54. Two options are provided for rotating the monitor 56 by 180°. In a first option, the second coupling unit 76 allows the monitor 56 to rotate about a horizontal axis 61. In a second option, a pin 65 and a socket 67 that mates therewith allow the monitor 56 to rotate by 180° about a vertical axis 63 running along the length of the pin 65. This second option has the virtue that an image displayed on the monitor 56 need not be rectified by rotating the image by 180° after the monitor 56 is rotated by 180°, which type of rectification would be needed if the rotation is done via option 1.

Figure 4A:
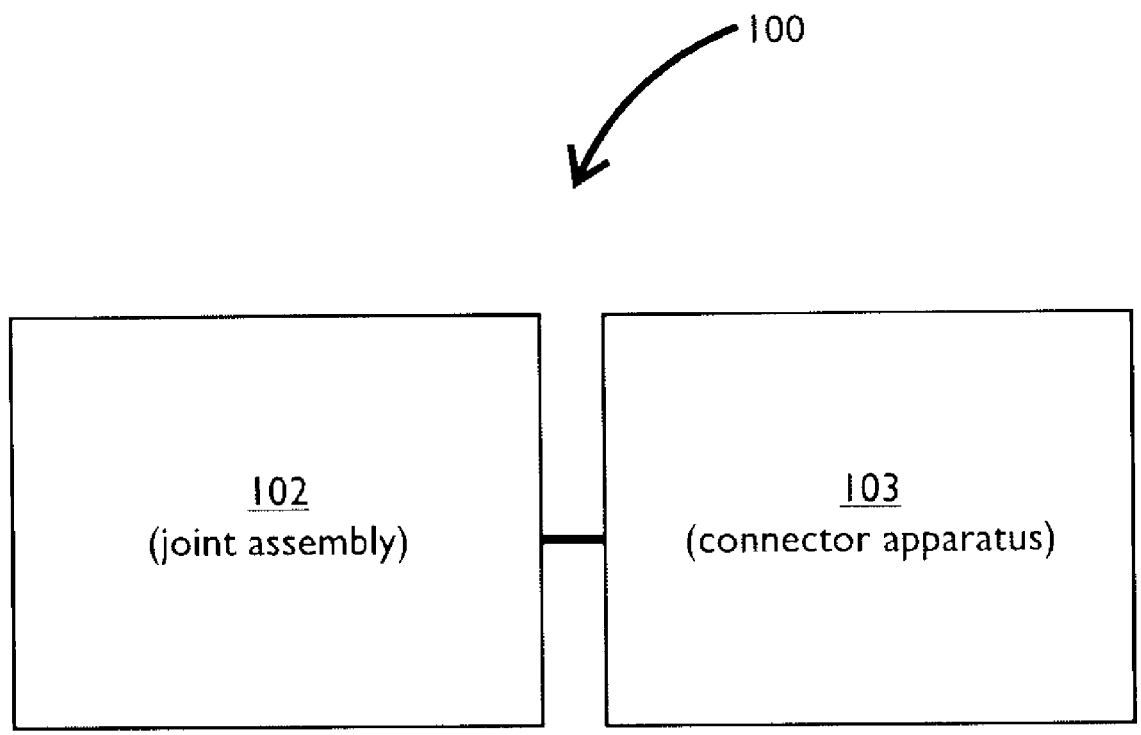
FIG. 4A shows a block diagram of a coupling unit that can be used in the multi-monitor display systems shown in FIGS. 1A-3D, according to the principles of the present invention.

FIGS. 4A-D show one embodiment of any or all of the coupling units 34, 36, 39, 41, 45, 47, 74, 76, 234, 236, 237 and 239. FIG. 4A shows a block diagram of a coupling unit 100. The coupling unit 100 includes a joint assembly 102 and a connector apparatus 103. The joint assembly 102 permits a monitor coupled to an arm via the coupling unit to rotate about one or more axes. The connector apparatus 103 permits the monitor to be connected and disconnected from the arm, while, optionally, providing electrical connection and disconnection. An example of a connector apparatus has been previously described in U.S. Pat. No. 6,702,604 issued to Moscovitch, the contents of which are incorporated herein by reference. The joint assembly 102 is preferably attached to the arm, and the connector apparatus 104 is preferably attached to the monitor, although it is also possible to attach the joint assembly to the monitor, and the connector apparatus to the arm.

Figure 4B:
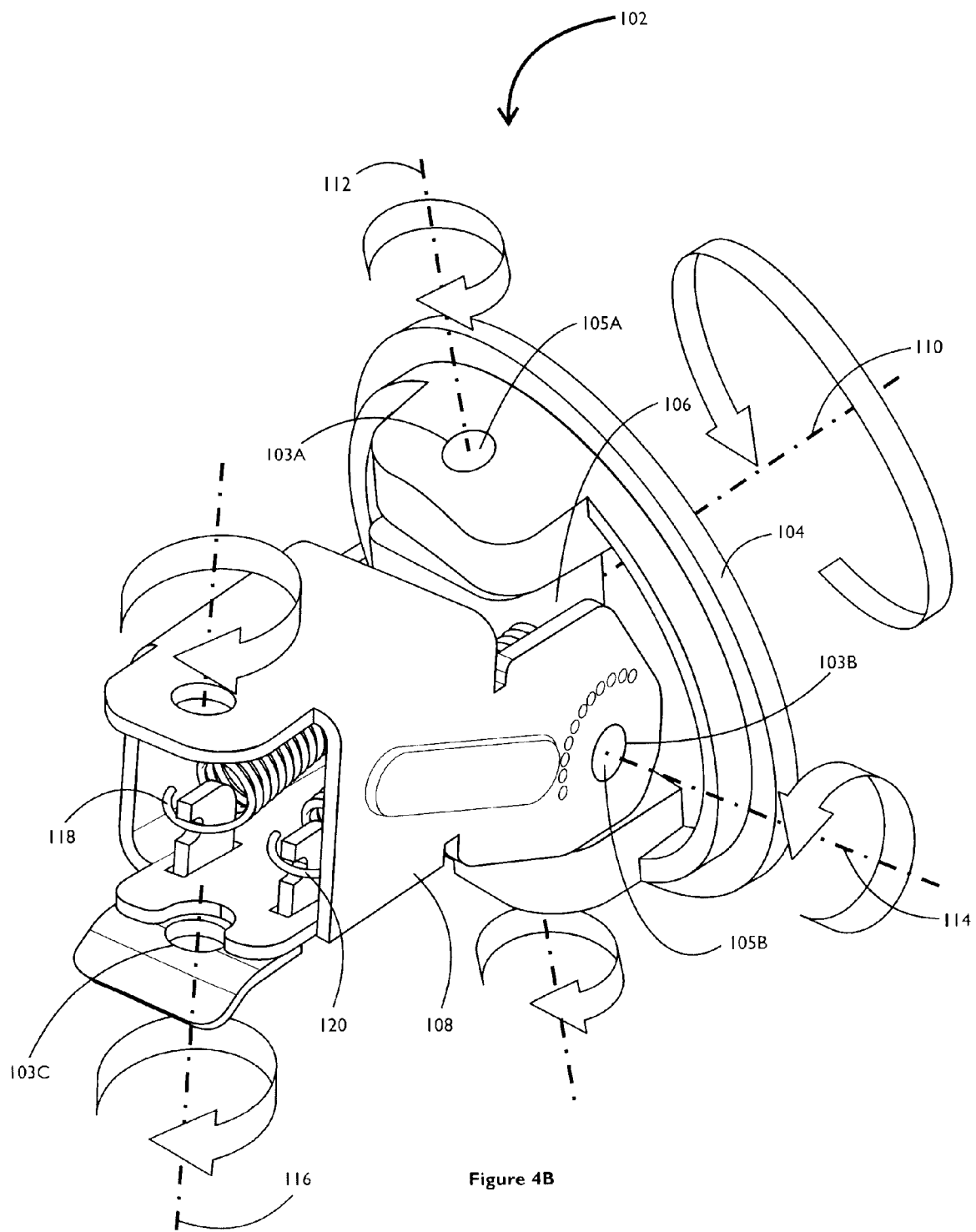
FIGS. 4B and 4C show two stereographic views of a joint assembly of the coupling unit of FIG. 4A.
Figure 4C:
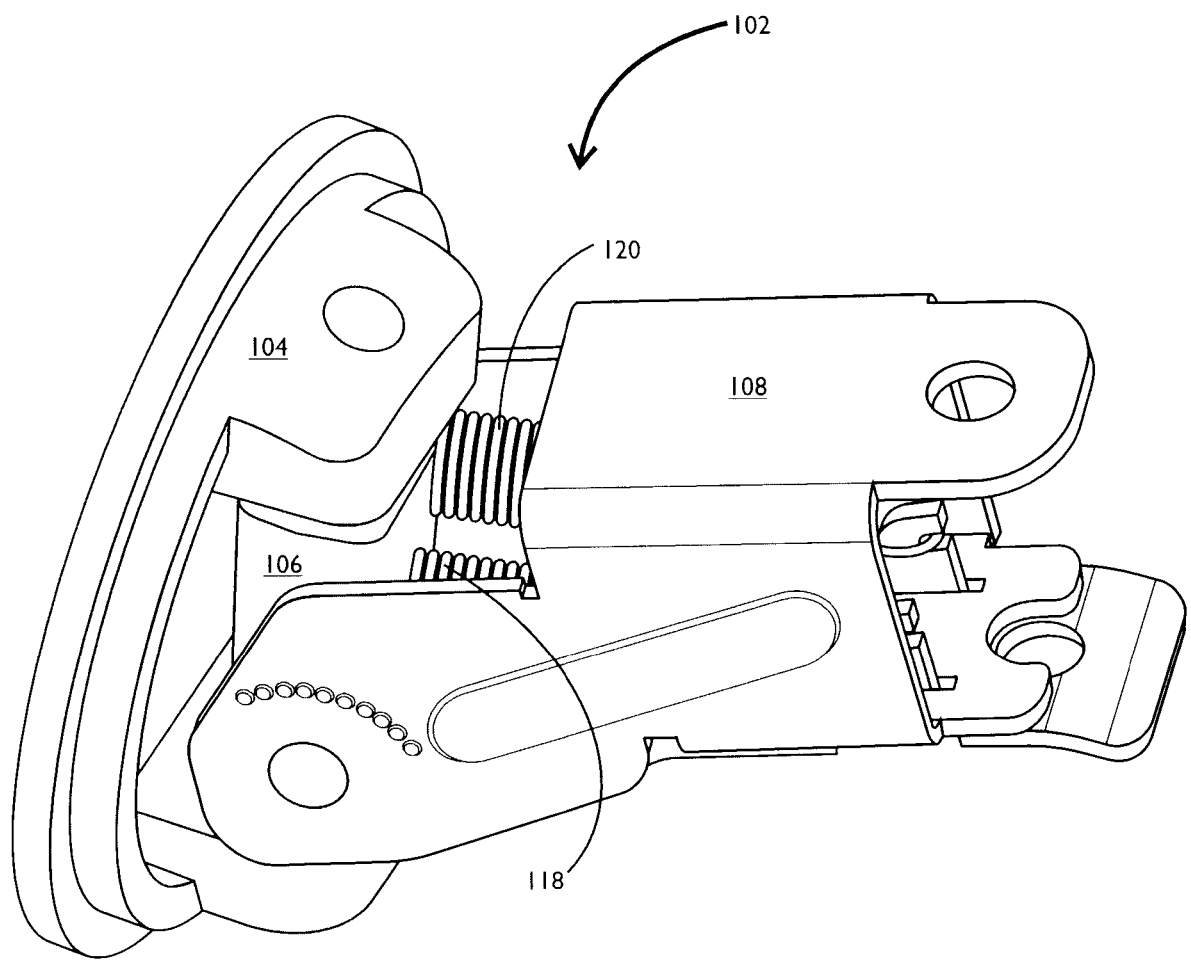
Figure 4D:
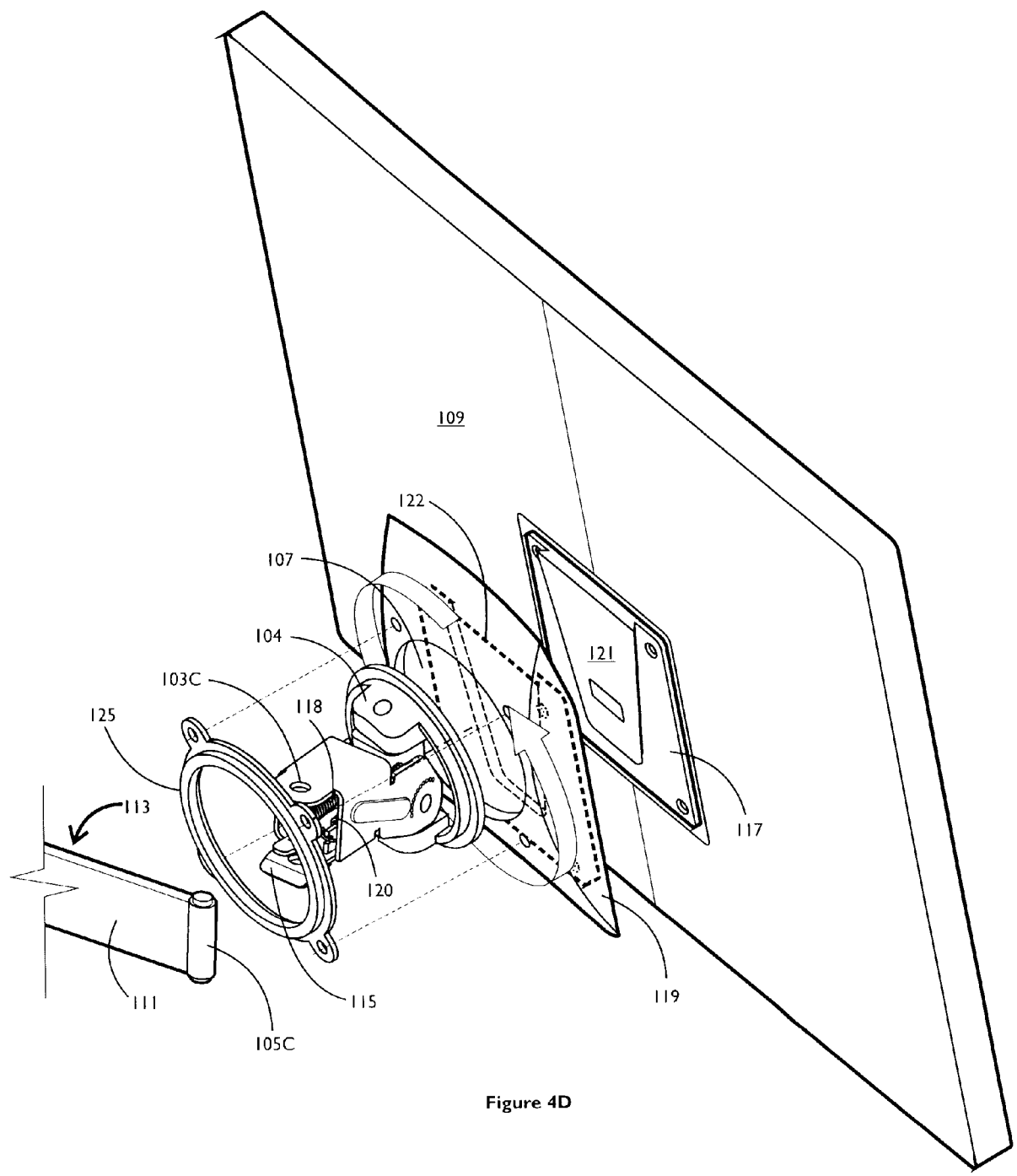
FIG. 4D shows a joint assembly and one embodiment of the connector apparatus of FIG. 4A.

FIGS. 4B-4D show one embodiment of the joint assembly 102 of the coupling unit 100. The joint assembly includes a ring portion 104, a block portion 106 and a longitudinal portion 108. The ring portion 104 can rotate about a nominal first axis 110. The joint assembly 102 has three pairs of holes 103A, 103B and 103C that accept corresponding connectors or pins 105A, 105B and 105C (the latter pin is shown in FIG. 4D), which permit rotation about three nominal axes 112, 114 and 116.

The ring portion 104 is coupled to the connector apparatus 103. In particular, the ring portion mates with a complimentary shaped structure 107, which can include a bushing, of the connector apparatus 103, which is disposed at the back of the monitor 109.

The ring portion 104 can rotate about the first axis 110, which is perpendicular to the face of the monitor 109, by rotationally sliding within the complimentary shaped structure 107, which is part of the connector apparatus 103 connected to the monitor 109. This rotation allows the monitor 109 to rotate from landscape to portrait positions.

The block portion 106 is coupled to the ring portion 104 via at least one connector or pin 105A, which is inserted in the holes 103A. The ring portion 104 can also rotate about the axis 112, which is perpendicular to the axis 110 and disposed along the length of the first pin 105A. This rotation allows the monitor 109 to angle (or "book" or swivel) left or right, towards or away from another monitor in a two-monitor display system, for example.

The longitudinal portion 108 is coupled to the block portion 106 via the second connector or pin 105B that allows the block portion 106 to rotate about the third axis 114 substantially perpendicular to the first and second axes 110 and 114. Thus, the block portion 106 can rotate about the axis 114, which rotation allows the monitor 109 to tilt up or down. Two springs 118 and 120 assist with this tilting. In particular, the two springs 118 and 120 are attached to the top half of the block portion 106 to act as a counter weight to counteract gravity during tilting of the monitor 109.

The longitudinal portion 108 engages a third connector or pin 105C (shown in FIG. 4C) that allows the longitudinal portion 108 to rotate about a fourth axis 116 that is substantially perpendicular to the first axis 110 and the third axis 114.

Thus, the longitudinal portion 108, which is attached to one of the end portions of the arm, can rotate about the axis 116. This rotation allows the monitors 54 or 56 to rotate 180°, as shown in FIG. 3A, for example.

FIG. 4D shows the pin 105C at an end portion 111 of an arm 113. By pulling downward on a lever 115, enough space is created to allow the pin 105C to engage with the holes 103C. The springs 118 and 120 also provide a biasing force to raise the lever 115 and help maintain the pin 105C engaged in the holes 103C.

A connector apparatus is described in U.S. Pat. No. 6,702,604. The connector apparatus 103 includes a first component 117 that mates with a complimentary shaped second component 119, and allows for both mechanical and electrical connection and disconnection. In U.S. Pat. No. 6,702,604, a ball joint is connected to the second component 19, whereas here, the joint assembly 102 replaces and is connected to the second component 119. The construction and operation of the connector apparatus 103 is otherwise similar. In particular, a wedge shaped male member 121 downwardly engages a complimentary shaped female member 122 on the side of the second component 119 that makes contact with the first component 117.

The ring portion 104 mates with a complimentary shaped structure 107 at the back of the second component 119. A retaining ring 125 secures the ring portion 104 to the second component 119. The retaining ring 125 can be screwed to the second component 119, for example.

Figure 5:
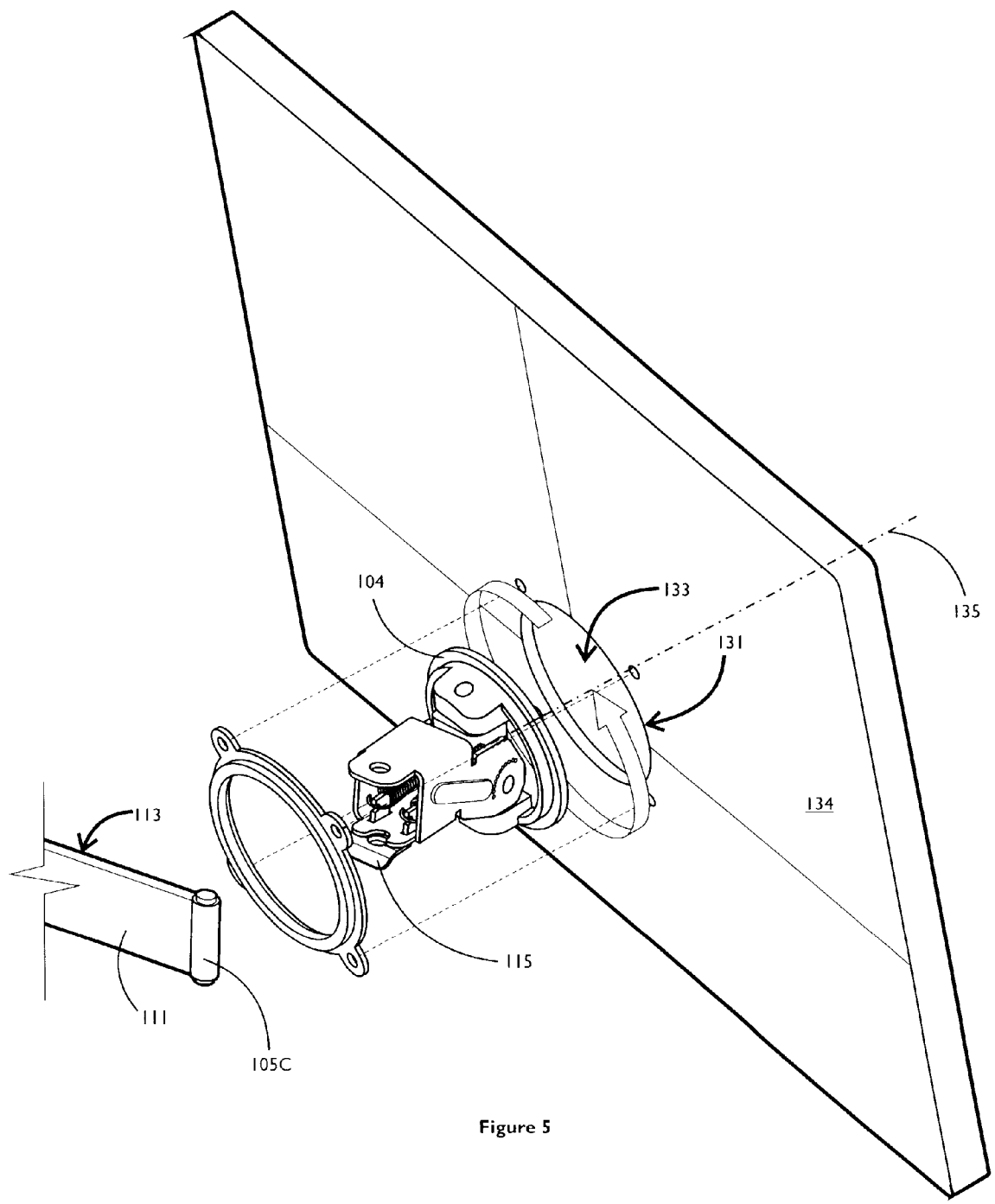
FIG. 5 shows a joint assembly and another embodiment of the connector apparatus of FIG. 4A.

FIG. 5 shows an exploded view of another embodiment of a connector apparatus 131. The ring portion 104 couples to the connector apparatus 131. In particular, the ring portion 104 mates with a complimentary shaped stricture 133 of the connector apparatus 131, which is disposed at the back of a monitor 134. The ring portion 104 can rotate about a first axis 135, which is perpendicular to the face of the monitor 134, by rotationally sliding within the complimentary shaped structure 133. The connector apparatus 131 can include a bushing (not shown) to facilitate the rotation. This rotation allows the monitor 134 to rotate from landscape to portrait positions.

Figure 6:
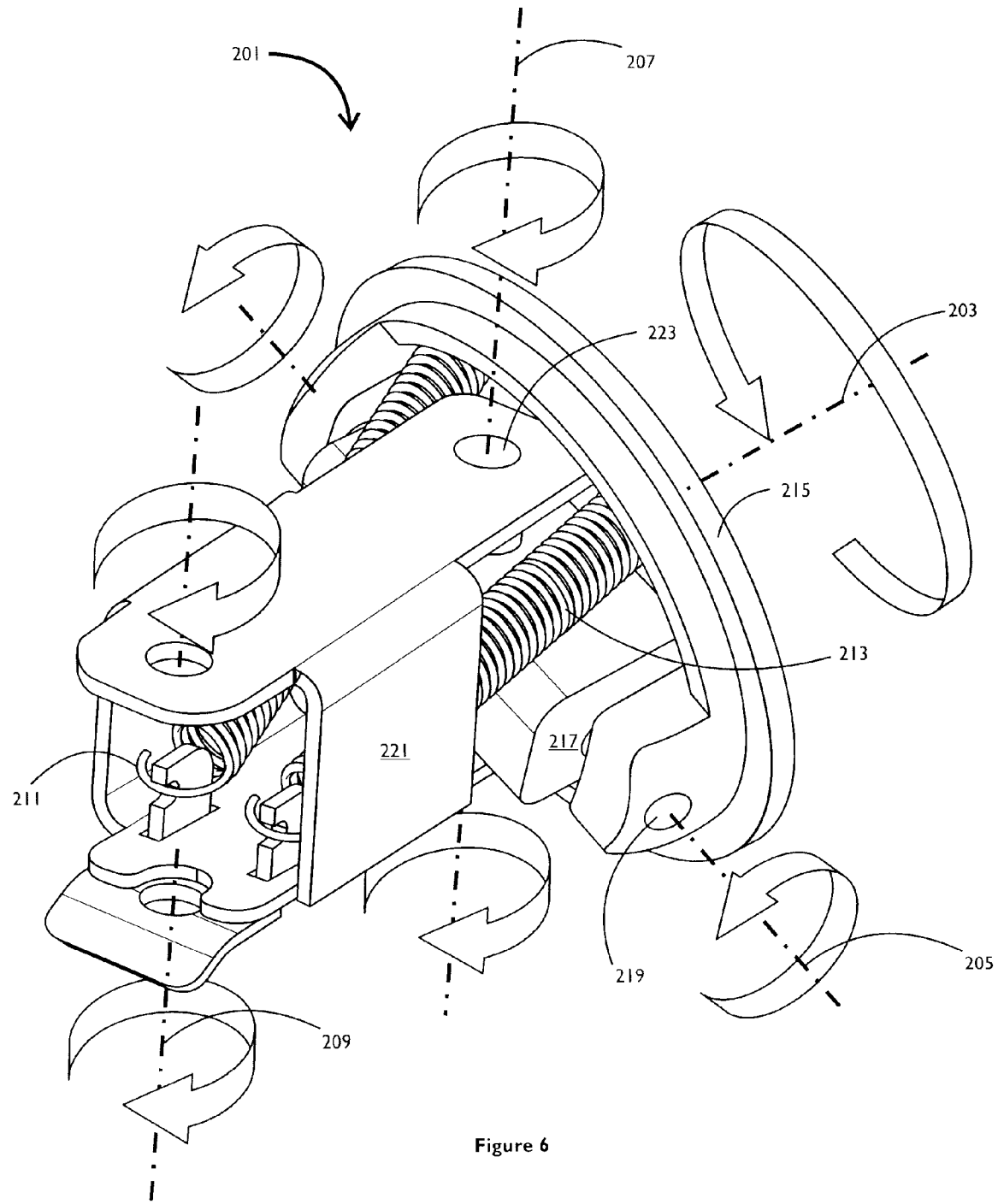
FIG. 6 shows another embodiment of a joint assembly of the coupling unit of FIG. 4A

FIG. 6 shows another embodiment of the joint assembly 201 having a different geometry to that shown in FIGS. 4B-4D. The joint assembly 201 allows rotations about a first axis 203, a second axis 205, a third axis 207 and a fourth axis 209. It will be noted that in this embodiment, the fourth axis 209 is substantially parallel to a third axis 207 and substantially perpendicular to the second axis 205 (in FIGS. 4B-4D, the fourth axis is substantially perpendicular to the third axis). The second axis 205 is associated with tilting, the third axis 207 with booking, and the fourth axis 209 with the ability of a monitor to rotate by 180°, as in FIG. 3A. The springs 211 and 213 are attached to the top half of a ring portion 215 to act as a counter weight to counteract gravity during tilting of a monitor.

The ring portion 215 mates to a complimentary shaped structure (not shown in FIG. 6), similar to that shown in FIG. 4D or 5, on the monitor (not shown in FIG. 6). The ring portion 215 allows the monitor to rotate about the first axis 203, which is substantially perpendicular to the face of the monitor.

A block portion 217 is coupled to the ring portion 215 via at least one first pin 219 that allows the ring portion 215 to rotate about a second axis 205 substantially perpendicular to the first axis 203 and disposed along the length of the first pin 219.

A longitudinal portion 221 is coupled to the block portion 217 via at least one second pin 223 that allows the block portion 217 to rotate about a third axis 207 substantially perpendicular to the first and second axes 203, 205. The longitudinal portion 221 engages at least one third pin (not shown in FIG. 6), similar to the pin 105C of FIG. 4D or FIG. 5, that allows the longitudinal portion 221 to rotate about a fourth axis 209 that is substantially perpendicular to the first axis 203 and that is substantially perpendicular to the second axis 205.

While embodiments of this invention have been illustrated in the accompanying drawings and described above, it will be evident to those skilled in the art that changes and modifications may be made therein without departing from the essence of this invention. For example, while some embodiments have been shown that allow an arm to rotate from a horizontal to a vertical position, it should be understood that embodiments where the arm can only remain horizontal, or embodiments where the arm can only remain vertical are also contemplated by the inventor.

What is claimed is:

1. A multi-monitor support structure comprising a column; and
an arm coupled to the column for supporting monitors, the arm capable of being lengthened from a first length in which M monitors are supported to a second length in which N>M monitors are supported, wherein the arm includes
a central portion;
a first end portion connected to one end of the central portion for supporting a first monitor, the first end portion being capable of extending from a retracted position to an extended position and having a first coupling unit for coupling a first monitor to the arm; and
a second end portion connected to an opposite end of the central portion for supporting a second monitor, the second end portion being capable of extending from a retracted position to an extended position and having a second coupling unit for coupling a second monitor to the arm, such that the arm has the first length when the first and second end portions are in the retracted positions, and the second length when the first and second end portions are in the extended positions, wherein, with the first and second end portions in the retracted positions, the first monitor and the second monitor are adjacent when supported therefrom, and with the first and second end portions in the extended positions, a gap appears between the first monitor and the second monitor when supported by the first and second end portions, the gap being wide enough to accommodate a third monitor.

2. The structure of claim 1, wherein at least one of the first coupling unit and the second coupling unit allows the monitor coupled therewith to the arm to rotate 180° about a vertical axis.

3. The structure of claim 2, further comprising a first monitor and a second monitor, wherein the first coupling unit couples the back of the first monitor to the arm, and the second coupling unit couples the back of the second monitor to the arm.

4. The structure of claim 1, wherein the at least one of the first coupling unit and the second coupling unit allows the monitor coupled therewith to the arm to rotate from a landscape position to a portrait position.

5. The structure of claim 1, further comprising a third coupling unit for coupling the third monitor to the central portion in the gap between the first and second monitors when the first and second end portions are in the extended positions.

6. The structure of claim 5, wherein the third coupling unit is removably attached to the central portion.

7. A multi-monitor support structure comprising
a column; and
an arm coupled to the column for supporting monitors, the arm capable of being lengthened from a first length in which M monitors are supported to a second length in which N>M monitors are supported, wherein the arm includes
a central portion supported by the column;
a first end portion connected to one end of the central portion for supporting a first monitor; and
a second end portion connected to an opposite end of the central portion for supporting a second monitor, wherein, to lengthen the arm from the first length to the second length, the first end portion is replaceable by a longer third end portion capable of supporting a monitor and the second end portion is replaceable by a longer fourth end portion capable of supporting another monitor, wherein, when the first monitor and the second monitor are supported on the arm by the first and second end portions, respectively, the first and second monitors are adjacent, but if supported by the third and fourth end portions, respectively, the first and second monitors leave a gap therebetween wide enough to attach a third monitor to the central portion.

8. The structure of claim 7, further comprising the third end portion and the fourth end portion.

9. The structure of claim 7, further comprising a third coupling unit for coupling the third monitor to the central portion in the gap.

10. The structure of claim 9, wherein the third coupling unit is removably attached to the central portion.

11. The structure of claim 10, further comprising the first and second monitors.

12. The structure of claim 8, wherein each of the first, second, third and fourth end portions has a respective coupling unit for coupling a monitor to the arm.

* * * * *